US011893787B2

(12) United States Patent
Pal

(10) Patent No.: US 11,893,787 B2
(45) Date of Patent: Feb. 6, 2024

(54) METHODS, DEVICES, AND SYSTEMS FOR IDENTIFYING POTENTIAL OBSTRUCTIONS OF ANTENNAE

(71) Applicant: DISH Network L.L.C., Englewood, CO (US)

(72) Inventor: Rajiv Singh Cullen Pal, Casper, WY (US)

(73) Assignee: DISH Network, L.L.C., Englewood, CO (US)

( * ) Notice: Subject to any disclaimer, the term of this patent is extended or adjusted under 35 U.S.C. 154(b) by 29 days.

(21) Appl. No.: 17/565,324

(22) Filed: Dec. 29, 2021

(65) Prior Publication Data

US 2023/0206624 A1 Jun. 29, 2023

(51) Int. Cl.
| | |
|---|---|
| *G06V 20/13* | (2022.01) |
| *H01Q 1/12* | (2006.01) |
| *G06T 7/20* | (2017.01) |
| *H01Q 19/13* | (2006.01) |
| *H04N 7/18* | (2006.01) |
| *G06V 20/52* | (2022.01) |
| *H01Q 1/24* | (2006.01) |
| *H04N 23/54* | (2023.01) |

(52) U.S. Cl.
CPC ............... *G06V 20/13* (2022.01); *G06T 7/20* (2013.01); *G06V 20/52* (2022.01); *H01Q 1/125* (2013.01); *H01Q 1/247* (2013.01); *H01Q 19/132* (2013.01); *H04N 7/185* (2013.01); *H04N 23/54* (2023.01)

(58) Field of Classification Search
None
See application file for complete search history.

(56) References Cited

U.S. PATENT DOCUMENTS

| 11,159,932 B1* | 10/2021 | Meyer | G06F 3/016 |
| 2013/0194126 A1* | 8/2013 | Paoletti | G01S 13/87 342/55 |
| 2015/0342723 A1* | 12/2015 | Abramson | A61F 2/141 623/6.64 |
| 2019/0317177 A1* | 10/2019 | Ertan | G01S 13/75 |
| 2021/0345939 A1* | 11/2021 | Jumbe | A61B 5/0002 |
| 2021/0405182 A1* | 12/2021 | Reynolds | G01S 13/89 |

* cited by examiner

*Primary Examiner* — Wilson Lee
(74) *Attorney, Agent, or Firm* — Seed IP Law Group, LLP

(57) ABSTRACT

Disclosed is a system including a content receiver and an antenna coupled to the content receiver. A camera is mounted on the antenna. The content receiver includes a processor and a memory storing instructions that, when executed by the processor, cause the content receiver to: output a control signal to the camera mounted on the antenna, receive image data from the camera mounted on the antenna, determine that the image data received from the camera mounted on the antenna indicates a potential or actual obstruction of the antenna or movement of the antenna, and output a message indicating that the potential or actual obstruction of the antenna or movement of the antenna device has been detected, in response to determining that the image data received from the camera mounted on the antenna indicates the potential or actual obstruction of the antenna or movement of the antenna.

7 Claims, 11 Drawing Sheets

METHODS, DEVICES, AND SYSTEMS FOR IDENTIFYING POTENTIAL OBSTRUCTIONS OF ANTENNAE

BACKGROUND

Technical Field

The present disclosure relates in general to radio frequency communications using antennae, and, in particular to methods, devices, and systems for identifying potential obstructions of antennae used in radio frequency communications.

Description of the Related Art

An antenna used in radio frequency (RF) communications may become obstructed for a variety of reasons. For example, in a direct broadcast satellite (DBS) system, an RF signal transmitted by a satellite may be received by a terrestrial satellite antenna with an unacceptably low signal strength due to the terrestrial satellite antenna becoming obstructed by seasonal foliage growth, which may result in degraded audio or video quality. Also, in a DBS system, an RF signal transmitted by a satellite may be received by a terrestrial satellite antenna with an unacceptably low signal strength due to seasonal weather conditions such as snow or heavy rain, for example. In addition, in a DBS system, an RF signal transmitted by a satellite may be received by a terrestrial satellite antenna with an unacceptably low signal strength due to an orientation of the terrestrial satellite antenna becoming misaligned with a transmitting antenna of the satellite due to movement of the terrestrial satellite antenna, for example, caused by strong winds, a kid's ball hitting the terrestrial satellite antenna, roof maintenance, etc.

Currently, a provider of a DBS system does not know that there is a potential issue related to unacceptably low signal strength at a terrestrial satellite antenna until after a user calls a customer service representative and complains about poor audio or video quality. Although unacceptably low signal strength at a terrestrial satellite antenna in a DBS system may be caused by seasonal foliage growth or inclement weather, which occurs through no fault of a provider of the DBS system, a user of the DBS system may become frustrated with the provider of the DBS system and cancel a subscription with the provider of the DBS system. Accordingly, it may be desirable to proactively identify a potential obstruction of a terrestrial satellite antenna used in a DBS system or movement of the terrestrial satellite antenna before a user becomes frustrated and cancels their subscription with a provider of the DBS system.

BRIEF SUMMARY

According to the present disclosure, an antenna device includes a camera device that takes photographs or video, which are used to determine whether the antenna device is currently being obstructed. Also, the photographs taken by the camera device may be used to proactively predict that the antenna device is likely to become obstructed, for example, due to foliage growth. Accordingly, the antenna device can be inspected and a potential obstruction of the antenna device (e.g., foliage growth) can be cleared before the potential obstruction becomes an actual objection of the antenna device that results in poor signal quality. In addition, the photographs taken by the camera device of the antenna device may be used to detect movement of the antenna device (e.g., caused by strong winds) and a user can be alerted that there is a problem with the orientation of the antenna device.

Thus, the present disclosure improves conventional RF communication technologies (e.g., DBS technology) by providing methods, devices, and systems that enable potential issues to be proactively identified and remedied before the potential issues become actual problems that result in poor signal quality. In addition, an actual problem that results in poor signal quality can be identified before a user experiences poor audio or video quality and calls to complain about poor service. Accordingly, a technician can be dispatched to correct the problem before the user experiences poor audio or video quality and calls to complain about poor service, which may reduce a duration of time in which the user experiences poor service.

An antenna device according to an aspect of the present disclosure may be characterized as including: a reflector plate; a mounting arm coupled to the reflector plate; at least one low noise block downconverter feedhorn mounted on the mounting arm; and a camera device mounted on the reflector plate or the mounting arm. The camera device may be mounted on the reflector plate. The camera device may be mounted at a center of the reflector plate. The camera device, in operation, may output image data corresponding to an image of the at least one low noise block downconverter feedhorn.

The antenna device may include an interface device. The camera device, in operation, may receive electrical power via the interface device, and the camera device, in operation, may output image data via the interface device.

The at least one low noise block downconverter feedhorn may be coupled to a housing mounted on the mounting arm, and the camera device may be coupled to the housing mounted on the mounting arm.

A content receiver device according to an aspect of the present disclosure may be characterized as including: a first interface device; a processor coupled to the first interface device; and a memory storing instructions that, when executed by the processor, cause the content receiver device to: output a control signal via the first interface device, receive image data via the first interface device after the control signal is output via the first interface device, determine that the image data received via the first interface device indicates a potential or actual obstruction of an antenna device coupled to the content receiver device or movement of the antenna device coupled to the content receiver device, and output a message indicating that the potential or actual obstruction of the antenna device coupled to the content receiver device or movement of the antenna device coupled to the first interface device has been detected, in response to determining that the image data received via the first interface device indicates the potential or actual obstruction of the antenna device coupled to the content receiver device or movement of the antenna device coupled to the first interface device.

The content receiver device may include a transceiver coupled to the processor, and the instructions, when executed by the processor, may cause the content receiver device to output the message via the transceiver. The instructions, when executed by the processor, may cause the content receiver device to: receive input from a remote control device, and output the message via the transceiver in response to determining that the image data received via the first interface device indicates the potential or actual obstruction of the antenna device coupled to the content receiver device or movement of the antenna device coupled to the first interface device and in response to receiving the input from the remote control device. The instructions, when executed by the processor, may cause the content receiver device to: receive a request from another device, and transmit via the transceiver the image data received via the first interface device in response to receiving the request from the other device. The instructions, when executed by the processor, may cause the content receiver device to: receive a request from another device, and output the control signal via the first interface device in response to receiving the request from the other device.

The content receiver device may include a second interface device, and the instructions, when executed by the processor, may cause the content receiver device to output a signal via the second interface device, and the signal output via the second interface device may be configured to indicate that the potential or actual obstruction of the antenna device coupled to the content receiver device or movement of the antenna device coupled to the first interface device has been detected.

The content receiver device may include a second interface device, and the instructions, when executed by the processor, may cause the content receiver device to output a signal via the second interface device, and the signal output via the second interface device may be based on the image data received via the first interface device.

A system according to an aspect of the present disclosure may be characterized as including: a content receiver device and an antenna device coupled to the content receiver device. The camera device is mounted on the antenna device. The content receiver device includes: a first processor; and a first memory storing instructions that, when executed by the first processor, cause the content receiver device to: output a control signal to the camera device mounted on the antenna device, receive image data from the camera device mounted on the antenna device, determine that the image data received from the camera device mounted on the antenna device indicates a potential or actual obstruction of the antenna device or movement of the antenna device, and output a message indicating that the potential or actual obstruction of the antenna device or movement of the antenna device has been detected, in response to determining that the image data received from the camera device mounted on the antenna device indicates the potential or actual obstruction of the antenna device or movement of the antenna device.

The instructions, when executed by the first processor, may cause the content receiver device to: output a signal based on the image data received from the camera device mounted on the antenna device. The signal output by the content receiver device based on the image data received from the camera device mounted on the antenna device may be configured to indicate that the potential or actual obstruction of the antenna device or movement of the antenna device has been detected. The instructions, when executed by the first processor, may cause the content receiver device to: receive input from a remote control device, and output the message in response to determining that the image data received from the camera device mounted on the antenna device indicates the potential or actual obstruction of the antenna device or movement of the antenna device and in response to receiving the input from the remote control device.

The instructions, when executed by the first processor, may cause the content receiver device to: receive a request from an image analysis device, and output the control signal to the camera device mounted on the antenna device in response to receiving the request from the image analysis device.

The instructions, when executed by the first processor, may cause the content receiver device to transmit to the image analysis device the image data received from the camera device mounted on the antenna device. The system may include the image analysis device, and the image analysis device may include: a second processor; and a second memory storing instructions that, when executed by the second processor, cause the image analysis device to: transmit the request to the content receiver device, receive the image data from the content receiver device, compare the image data received from the content receiver device with stored image data to determine that the image data received from the content receiver device indicates the potential or actual obstruction of the antenna device coupled to the content receiver device or movement of the antenna device coupled to the content receiver device, and transmit to the content receiver device a message including information indicating that the image data indicates the potential or actual obstruction of the antenna device coupled to the content receiver device or movement of the antenna device coupled to the content receiver device. The instructions stored by the first memory, when executed by the first processor, may cause the content receiver device to: receive from the image analysis device the message including information indicating that the image data indicates the potential or actual obstruction of the antenna device coupled to the content receiver device or movement of the antenna device coupled to the content receiver device, and determine that the image data received from the camera device mounted on the antenna device indicates the potential or actual obstruction of the antenna device or movement of the antenna device in response to receiving from the image analysis device the message including information indicating that the image data indicates the potential or actual obstruction of the antenna device coupled to the content receiver device or movement of the antenna device coupled to the content receiver device.

DETAILED DESCRIPTION

Figure 1:
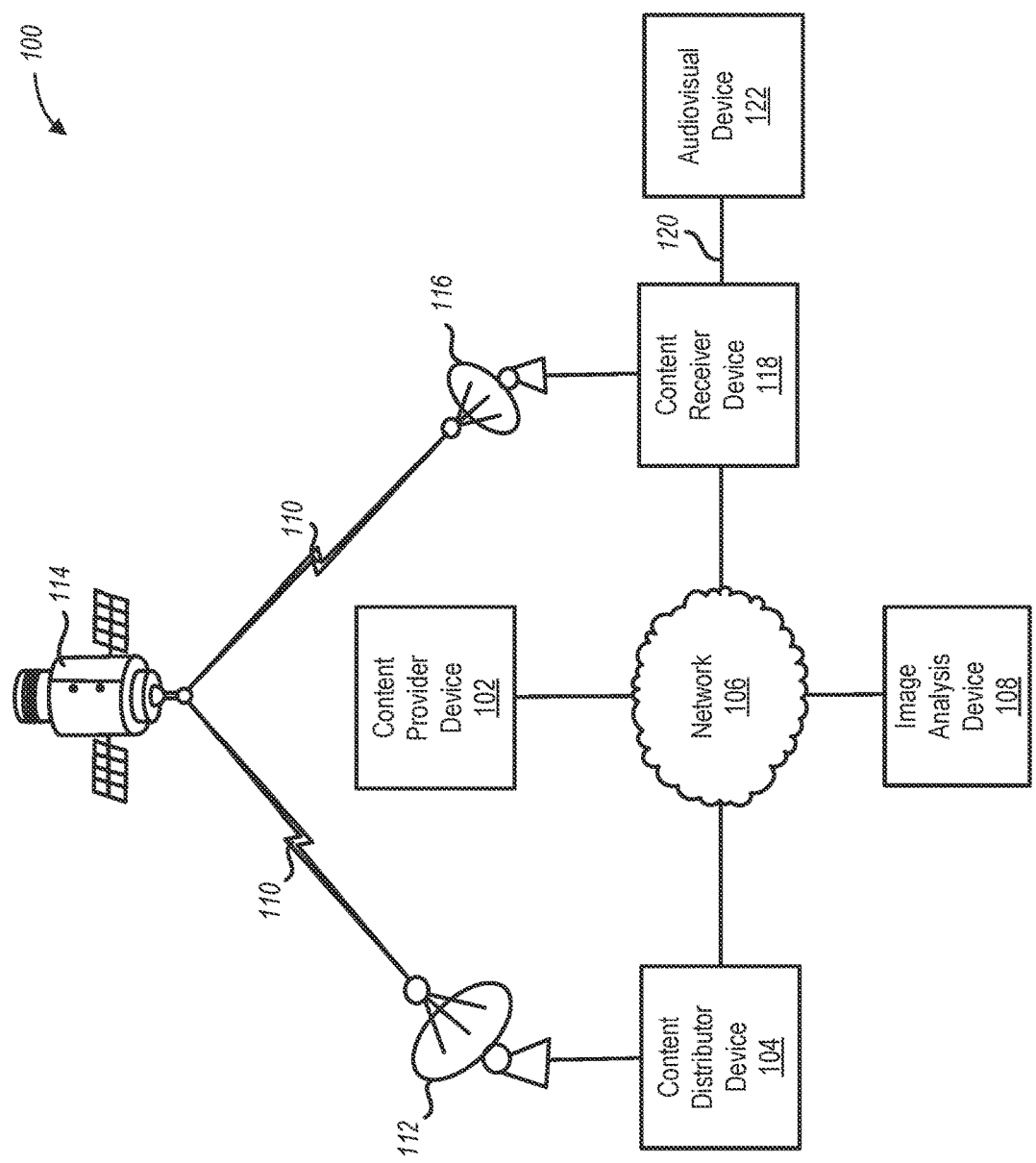
FIG. 1 is a network diagram of a content distribution system according to one or more embodiments of the present disclosure.

FIG. 1 is a network diagram of a content distribution system 100 according to one or more embodiments of the present disclosure. The content distribution system 100 may be used to provide a DBS subscription service, for example. A content provider device 102 (e.g., operated by ABC, CBS, NBC, HBO, ESPN, etc.) provides programming content (e.g., audio/video/data included in television programs) and related information (e.g., electronic programming guide data) to a content distributor device 104 (e.g., operated by Dish Network). The content distributor device 104 combines signals including the programming content and related information into a signal 110, and transmits the signal 110 from a transmitting antenna 112 to a satellite 114, which retransmits the signal 110 to a terrestrial antenna device 116.

The antenna device 116 outputs the signal 110 to a content receiver device 118 (e.g., a set top box, etc.). The content receiver device 118 includes one or more tuners and typically demodulates the signal, demultiplexes out a desired service, decodes it from digital format, and reformats it into an appropriate analog or digital audiovisual signal in a predetermined format (e.g., National Television Standards Committee (NTSC), Phase Alternate Lines (PAL), and Advanced Television Standards Committee (ATSC)). The content receiver device 118 may then output an audiovisual signal 120, as appropriate, to an audiovisual device 122 (e.g., a television, display, stereo amplifier, VCR). Although only one audiovisual device 122 is illustrated in FIG. 1, the content receiver device 118 may output signals to more than one audiovisual device 122. For example, the content receiver device 118 may output a signal including an audio portion of a television program to a stereo amplifier and also output a signal including a video portion of the television program to a television. The content receiver device 118 and the audiovisual device 122 may be located in a user's premises, such as a house. In addition, the content receiver device 118 may be capable of receiving content from other devices (e.g., VCR, DVD player).

The content distribution system 100 also includes an image analysis device 108, which may be operated by a provider of the content distributor device 104. In one or more embodiments, the image analysis device 108 includes one or more processors and a memory storing instructions that, when executed by the one or more processors cause the image analysis device 108 to perform the functions of the image analysis device 108 described herein. The image analysis device 108 can request image data from the content receiver device 118, and analyze the image data from the content receiver device 118. In one or more embodiments, the image analysis device 108 requests image data from the content receiver device 118 by sending a request message to the content receiver device 118 via the network 106. In one or more embodiments, the image analysis device 108 requests image data from the content receiver device 118 by sending a request message to the content distributor device 104, which transmits the request message to the receiver device 118 via a signal transmitted by the satellite 114.

Figure 2:
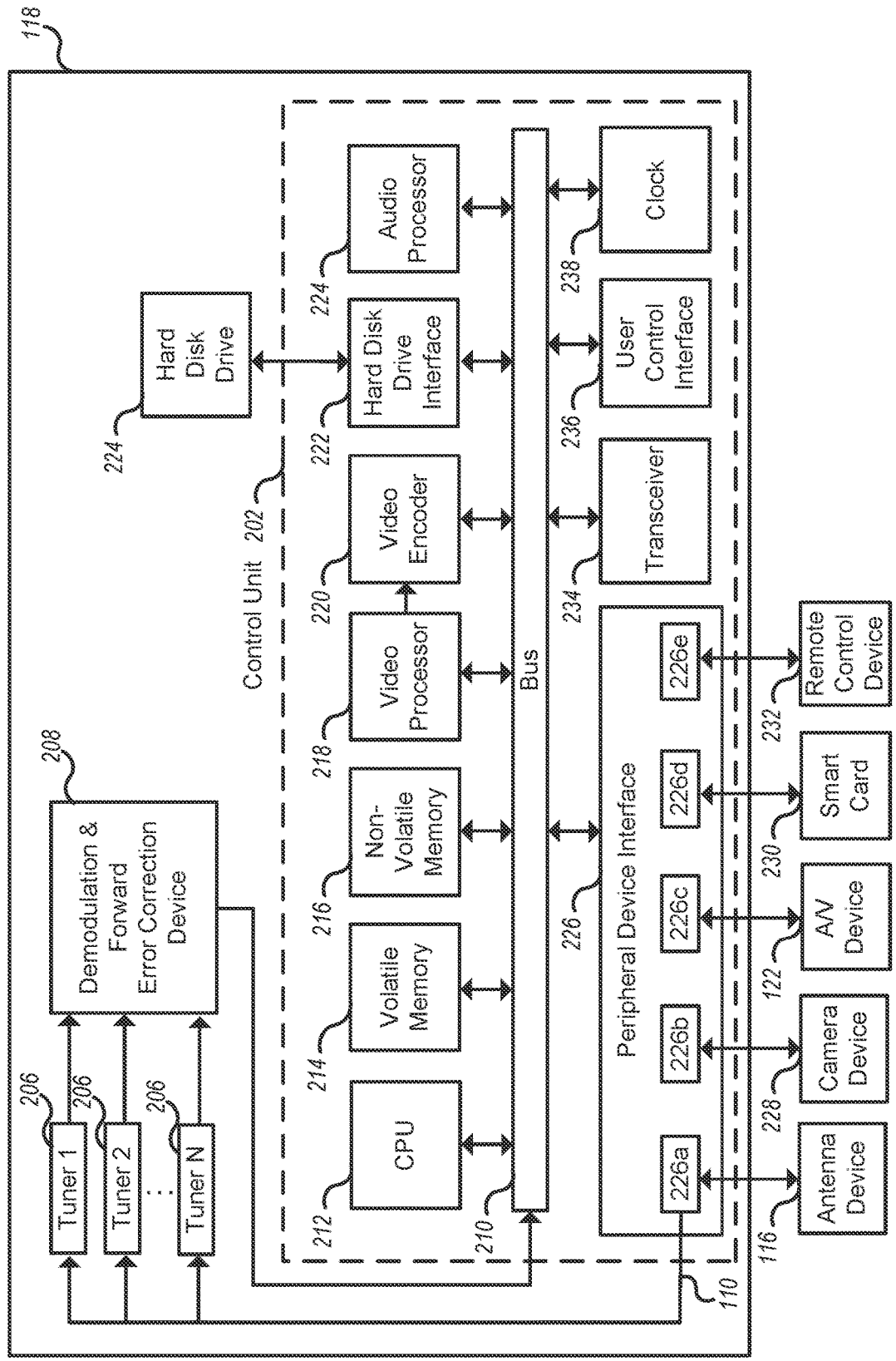
FIG. 2 is a block diagram of a content receiver device according to one or more embodiments of the present disclosure.

FIG. 2 is a block diagram of the content receiver device 118 according to one or more embodiments of the present disclosure. The content receiver device 118 may be a set-top box or cable or satellite television converter device having DVR functionality, for example.

The signal 110 that is input to the content receiver device 118 is typically processed prior to being output from the content receiver device 118. The content receiver device 118 may include one or more tuner devices 206, which may receive the signal 110 broadcast from the content distributor device 104 and retransmitted by the satellite 114 shown in FIG. 1, for example. The tuners 206 may receive commands in the form of signals from a control unit 202. Such commands may cause each of the tuners 206 to tune to a particular frequency band corresponding to a television channel that a user would like to view on a peripheral device and/or would like to record in the content receiver device 118.

The signal 110 may be an analog or a digital signal onto which data is modulated. Signals output from the tuners 206 are provided to a demodulation and forward error correction device 208. The demodulation and forward error correction device 208 demodulates the signal 110 according to known modulation methods to recover the data. Such modulation methods may include amplitude modulation (AM) or frequency modulation (FM). If the data is transmitted in a digital format, the modulation methods may include bi-phase-shift keying (BPSK), quadrature phase-shift keying (QPSK), or eight-phase shift keying (8PSK), for example. The demodulation and forward error correction device 208 also may process the data according to known forward error correction (FEC) methods. Such methods may include inspecting parity bits included in the data.

Signals output from the demodulation and forward error correction device 208 are provided to the control unit 202. Various components of the control unit 202 may be included in one or more integrated circuits. The control unit 202 may operate under the control of a software program, firmware program, or some other program stored in memory or control logic. The control unit 202 may include fewer, more, or different components from those shown in FIG. 2 and described below.

The control unit 202 includes a shared bus 210 that communicatively couples at least one central processing unit (CPU) 212, a volatile memory 214, and a non-volatile memory 216. The non-volatile memory 216 may store control programs that are loaded into the volatile memory 214 and executed by the CPU 212. Additionally, the volatile memory 214 and/or the non-volatile memory 216 may store other data, such as electronic program guide (EPG) data.

The control unit 202 may include at least one video processor 218 that decodes and processes an encoded signal. The video processor 218 may include a graphics processor, a MPEG-2 decoder, and a display compositor with on-screen display (OSD) control for peripheral devices, for example. Also, the control unit 202 may include a video encoder 220 that may work in combination with the video processor 218 to encode the audiovisual signal 120 that is output to one or more peripheral devices, such as the audiovisual device 122, which may be a television, for example. The video encoder 220 may translate a digital stream into a signal according to the NTSC, PAL, or SECAM standards.

The control unit 202 also may include at least one hard disk drive interface 222 and a hard disk drive 224. The hard disk drive interface 222 may provide a standard ATA/ATAPI interface or IDE/EIDE interface for transferring information to and from the hard disk drive 224. The hard disk drive 224 may store recorded programs, buffered data from a program being viewed, EPG data, an operating system, control programs, timers, or other data, such as image data including a plurality of pixel values obtained from a camera device 228 of the antenna device 116. The hard drive 232 may be external and connected to the content receiver device 118, for example, using a USB 2.0 or IEEE 1394 (FireWire) connection.

In one or more embodiments, the camera device 228 includes a lens system that focuses light received by the camera device 228 onto an image sensor (e.g., a Charge Coupled Device (CCD) or a Complimentary Metal Oxide Semi-conductor (CMOS)). Also, the camera device 228 includes a memory and a processor that performs processing on the image data output by the image sensor, prior to storing the image data in the memory. In addition, the camera device 228 includes an interface device, and circuitry that obtains electrical power from the interface device and provides the electrical power to various components of the camera device 228 (e.g., image sensor, memory, and processor). For example, the camera device 228 includes a coaxial cable connector including a post with threads to which a coaxial cable can be attached, and circuitry that obtains electrical power from the coaxial cable attached to the coaxial cable connector using the Power over Coaxial (PoC) standard. The camera device 228 also includes circuitry that enables the processor of the camera device 228 to receive a control signal via the interface device. In response to receiving the control signal, the processor of the camera device 228 causes the image sensor to acquire image data (i.e., take a picture) and output or transmit the image data via the interface device (e.g., using the Ethernet over Coax (EoC) standard, the Data Over Cable Service Interface Specifications (DOCSIS) standard, or the Multimedia over Coax Alliance (MoCA) standard).

In addition, the control unit 202 may include an audio processor 224. The audio processor 224 may decode a digital stream 110 for output to one or more peripheral devices, such as a stereo amplifier or a television. For example, the audio processor 224 may decode MPEG-1 layers I/II and layer m, Dolby Digital, Dolby ProLogic, SRS/TruSurround encoded audio data that is included in a digital stream 110.

The control unit 202 may be connected to one or more peripheral devices through a peripheral device interface 226. The peripheral device interface 226 include a plurality of interface devices 226a, 226b, 226c, 226d, and 226e. For example, each of the interface devices 226a and 226b includes an F-Type female coaxial cable connector that is configured to receive a center conductor of a RG6 F-Type coaxial cable and threads configured to mate with threads included in a connector attached to the coaxial cable. For example, the interface device 226c may include an F-Type female coaxial cable connector that is configured to receive a center conductor of a RG59 F-Type coaxial cable and threads configured to mate with threads included in a connector attached to the coaxial cable; three female RCA ports configured to be coupled to two cables for analog audio (e.g., for left and right channels) and one cable for composite analog video, respectively; or a female High-Definition Multimedia Interface (HDMI) configured to be coupled to an HDMI cable. Also, the interface device 226d may be a smartcard connector including a socket into which a smartcard can be inserted. In addition, the interface device 226e may be an infrared transceiver that is configured to communicate by transmitting and receiving infrared signals (e.g., according to Infrared Data Association (IrDA) specifications).

Such peripheral devices may include the antenna device 116, the camera device 228, the audiovisual device 122, a smart card device 230, and a remote control device 232. The smart card device 230 may store subscriber account information and/or security information. The remote control device 232 may wirelessly transmit signals to the content receiver device 118 using UHF or IR communications. Such signals may indicate a television channel, which will cause the control unit 202 to change the frequency band to which one of the tuners 206 is tuned, process the signal output from that tuner 206, and provide the processed signal to a coaxial cable connector included in the peripheral device interface 226, which is connected to a coaxial cable that also is connected to the audiovisual device 122, for example. Although only one audiovisual device 122 is shown in FIG. 2, the peripheral device interface 226 may provide connections to more than one audiovisual device 122. The audiovisual device 122 may display graphical information corresponding to television programming content and/or user interface screens provided by the content receiver device 118. Additionally, the audiovisual device 122 may output sounds corresponding to the television programming content or user interfaces.

The content receiver device 118 also includes a transceiver 234 that is configured to transmit and receive information from the network 106. For example, the content receiver device 118 may utilize a modem to transmit data used to order pay-per-view programming or to receive EPG data using a standard telephone cable that is attached to the peripheral device interface 226 using a RJ-11 style connector. In one or more embodiments, the transceiver 234 is coupled to an eight-pin RJ45 connector configured to be coupled to an Ethernet cable through which messages transmitted to and received from the network 106. In one or more implementations, the transceiver 234 is configured to transmit and receive data signals in accordance with the Institute of Electrical and Electronics Engineers (IEEE) 802.3 communication standards. In one or more embodiments, the transceiver 234 includes at least one antenna that is configured to transmit and receive wireless signals in a particular RF band (e.g., 2.4 gigahertz (134 millimeter) ultra high frequency (UHF) band, or 5 gigahertz (60 millimeter) super high frequency (SHF) band). The transceiver 234 may be configured to transmit and receive RF signals via the at least one antenna in accordance with one or more of the IEEE 802.11 communication standards (e.g., 802.12A, 802.12B, 802.11g, 802.11n). The transceiver 234 may be configured to transmit and receive signals in accordance with other communication standards without departing from the scope of the present disclosure.

The control unit 202 may include a user control interface 236. The user control interface 236 may receive signals from buttons and/or a keypad of the content receiver device 118. For example, a user may operate the keypad to power the content receiver device 118 on and off, and to change the channel of the programming content that is being output from the peripheral device interface 226.

The content receiver device 118 also may include a clock 238. The clock 238 outputs a signal indicative of the current date and time. For example, the CPU 212 may utilize the output from the clock 238 to determine whether to begin or to end recording of programming content. Additionally, the CPU 212 may utilize the output from the clock 238 to determine what television program is currently being broadcast on a particular channel. For example, the content receiver device 118 may store EPG data or other scheduling information that identifies the television programs scheduled to be broadcast on each channel during a particular time period, which may include a start time, an end time, a title, a category, a type, and a textual description of each television program. The CPU 212 may use the output from the clock 238 and a channel identifier to determine the title or other unique identifier of the television program that is scheduled to be broadcast on a channel at the current time. Also, the CPU 212 may use the output of the clock 238 to include information that indicates a date and a time in metadata associated with image data generated by the camera device 228.

Figure 3:
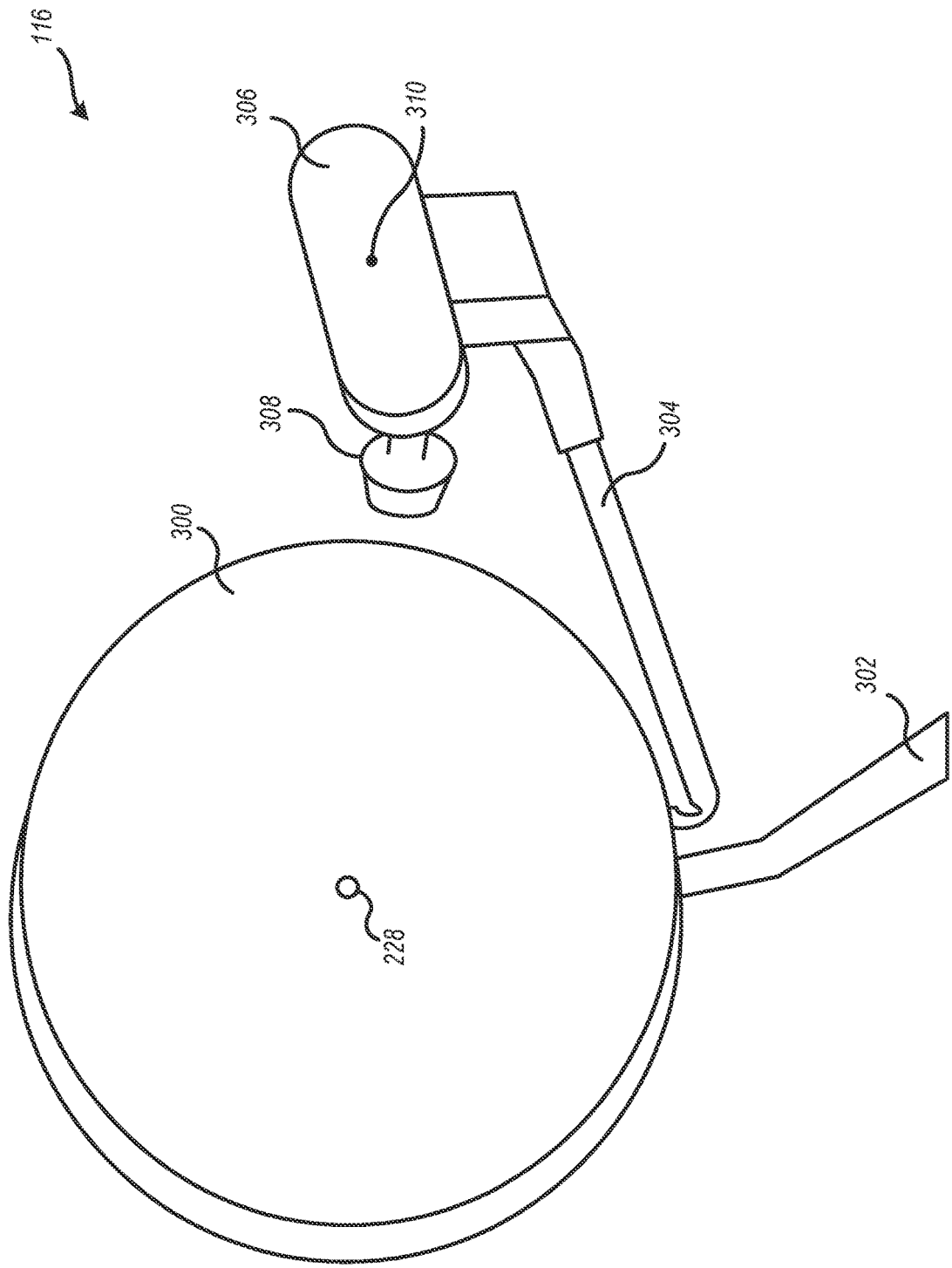
FIG. 3 is a perspective view of an antenna device according to one or more embodiments of the present disclosure.

FIG. 3 is a perspective view of the antenna device 116 according to one or more embodiments of the present disclosure. The antenna device 116 includes a reflector plate 300 that is formed from a material and/or coated with a material that reflects the signal 110 from the reflector plate 300 towards a focal point of the reflector plate 300, which is in front of the reflector plate 300. The reflector plate 300 is coupled to a first mounting arm 302 and a second mounting arm 304, for example, using a plurality of bolts or screws. The first mounting arm 302 is used to attach the antenna device 116 to a structure, such as the roof of a house, for example. The second mounting arm 304 extends in front of the reflector plate 300 and is coupled to a housing 306, for example, using a plurality of bolts or screws. The housing 306 is coupled to at least one Low Noise Block downconverter Feedhorn (LNBF), for example, using a plurality of bolts or screws. The at least one LNBF is positioned such that is at or adjacent to the focal point of the reflector plate 300. In one or more embodiments, the antenna device 116 is a model 1000.2 DPPLUS HDTV 119-110-129 western arc dish antenna available from Dish Network, as modified by the present disclosure.

In one or more embodiments, the camera device 228 is located at a center of the reflector plate 300 of the antenna device 116. For example, the reflector plate 300 of the antenna device 116 has a parabolic shape, and the camera device 228 is located at a geometric center of the parabolic shape of the reflector plate 300 of the antenna device 116. In one or more embodiments, the camera device 228 is coupled to the housing 306 of the antenna device 116. For example, the camera device 228 is coupled to the housing 306 at location 310 on a front facing surface of the housing 306.

In one or more embodiments, the camera device 228 is included in a modification kit that a technician uses to install the camera device 228 on an antenna device 116 that does not currently include the camera device 228. In one or more embodiments, the camera device 228 is included on an antenna device 116 during manufacturing of the antenna device 116.

Figure 4:
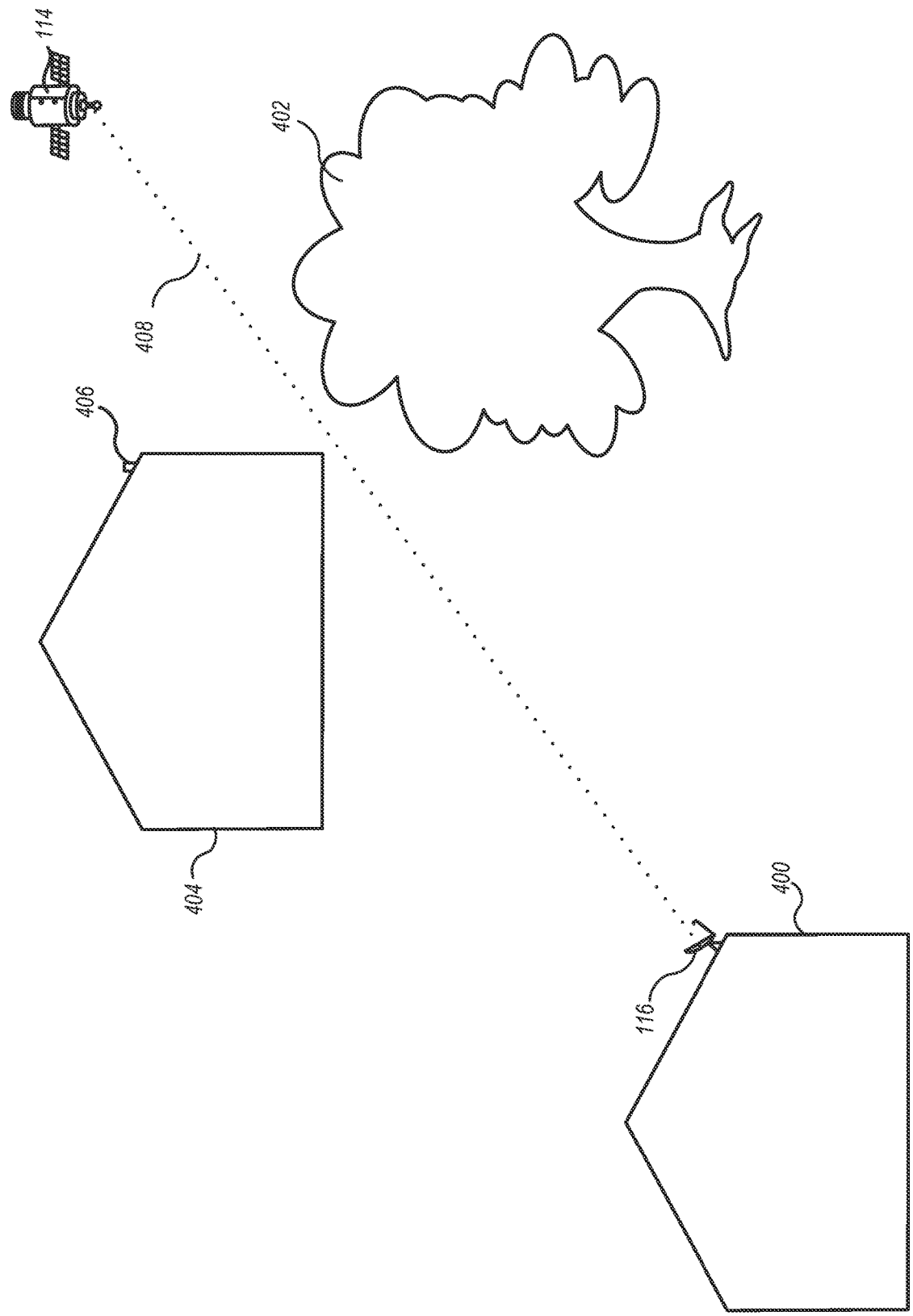
FIG. 4 is a diagram for explaining usage of an antenna device in a content distribution system according to one or more embodiments of the present disclosure.

FIG. 4 is a diagram for explaining usage of the antenna device 116 in the content distribution system 100 according to one or more embodiments of the present disclosure. The antenna device 116 is mounted to the roof of a house 400. For example, the first mounting arm 302 of the antenna device 116 mounted to the roof of the house 400 using a plurality of screws. A tree 402 and another house 404 are located in a vicinity of the house 400, in a direction in which the antenna device 116 is pointing (i.e., toward the satellite 114). The other house 404 includes a chimney 406. A dashed line 408 in FIG. 4 represents a line of sight between the antenna device 116 and the satellite 114. If an object (e.g., foliage of the tree 402) is disposed in the line of sight between the antenna device 116 and the satellite 114, the antenna device 116 is at least partially obstructed from receiving the signal 110 that is retransmitted by the satellite 114, which results in degraded signal quality at the antenna device 116.

Figure 5:
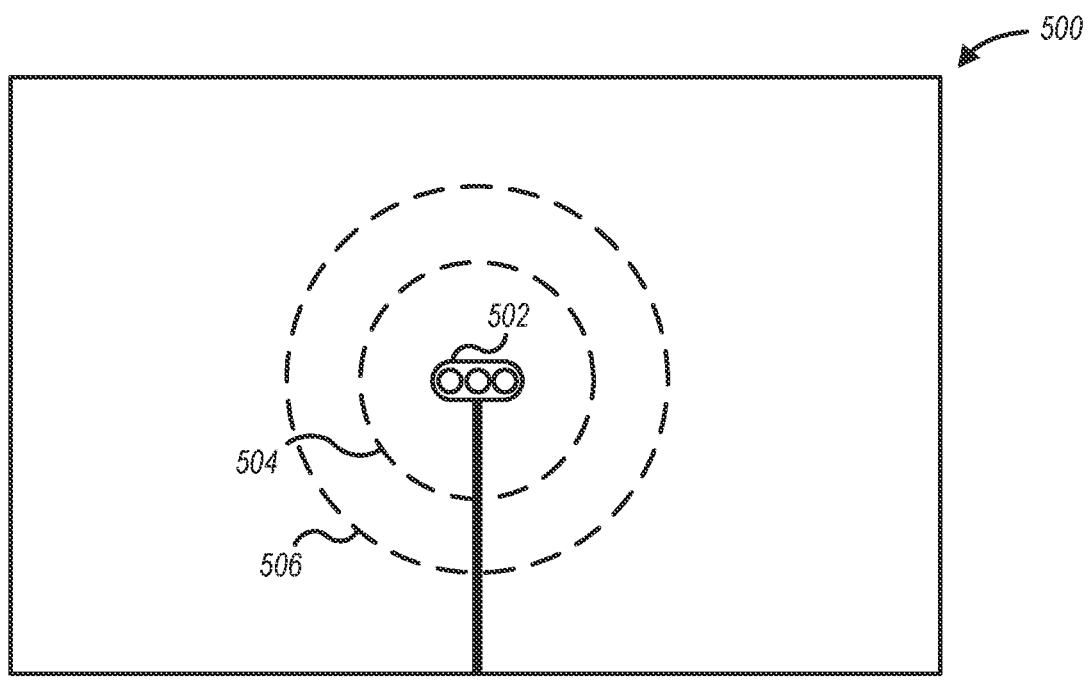
FIG. 5 shows an example of an image obtained using a camera device according to one or more embodiments of the present disclosure.

FIG. 5 shows an example of an image 500 obtained using the camera device 228 according to one or more embodiments of the present disclosure. The image 500 includes an object 502 corresponding to portions of the second mounting arm 304, the housing 306, and three LNBFs 308 of the antenna device 116. The image 500 includes a first region or area 504 and a second region or area 506. The first region or area 504 is selected such that, if an object is included within the first region or area 504, the object at least partially obstructs at least one of the LNBFs 308 from receiving the signal reflected by the reflector plate 300 of the antenna device 116. The second region or area 506 is selected such that, if an object is included within the second region or area 506, the object is likely to at least partially obstruct at least one of the LNBFs 308 from receiving the signal reflected by the reflector plate 300 of the antenna device 116, if the object grows in size or moves such that the object become located in the first region or area 504. For example, the image 500 may be obtained by a manufacturer of the antenna device 116 or the camera device 228, and the first region or area 504 and the second region or area 506 may be obtained through experimentation by moving different objects into a field of view of the camera device 228 and observing a signal level of a signal output from each of the one or more of the LNBFs 308 of the antenna device 116.

In one or more embodiments, the hard drive 224 of the content receiver device 118 stores image data corresponding to the image 500, along with information that identifies boundaries of the first region or area 504 and the second region or area 506. For example, the content receiver device 118 may be installed in the house 400 with the hard drive 224 preloaded with the image data corresponding to the image 500, along with information that identifies particular pixels in the image 500 corresponding to the boundaries of the first region or area 504 and the second region or area 506, of the content receiver device 118. In one or more embodiments, the image analysis device 108 transmits the image data corresponding to the image 500, along with the information that identifies the boundaries of the first region or area 504 and the second region or area 506, to the content receiver device 118 via the network 106, or via the content distributor device 104 and the satellite 114.

In one or more embodiments, the content receiver device 118 (or the image analysis device 108) uses the information that identifies the boundaries of the first region or area 504 and the second region or area 506 to determine regions in different images that are compared. For example, the content receiver device 118 (or the image analysis device 108) uses the information that identifies the boundaries of the first region or area 504 to determine a first set of pixels corresponding to the first region or area 504 of a first image and to determine a second set of pixels corresponding to the first region or area 504 of a second image. The content receiver device 118 (or the image analysis device 108) then compares values of corresponding pixels in the first and second sets of pixels to determine a percentage of pixels that have different values between the first and second sets of pixels. The content receiver device 118 (or the image analysis device 108) may determine that there is an obstruction or movement of the antenna device 116 if the percentage of pixels that have different values between the first and second sets of pixels is greater than a predetermined value.

Figure 6A:
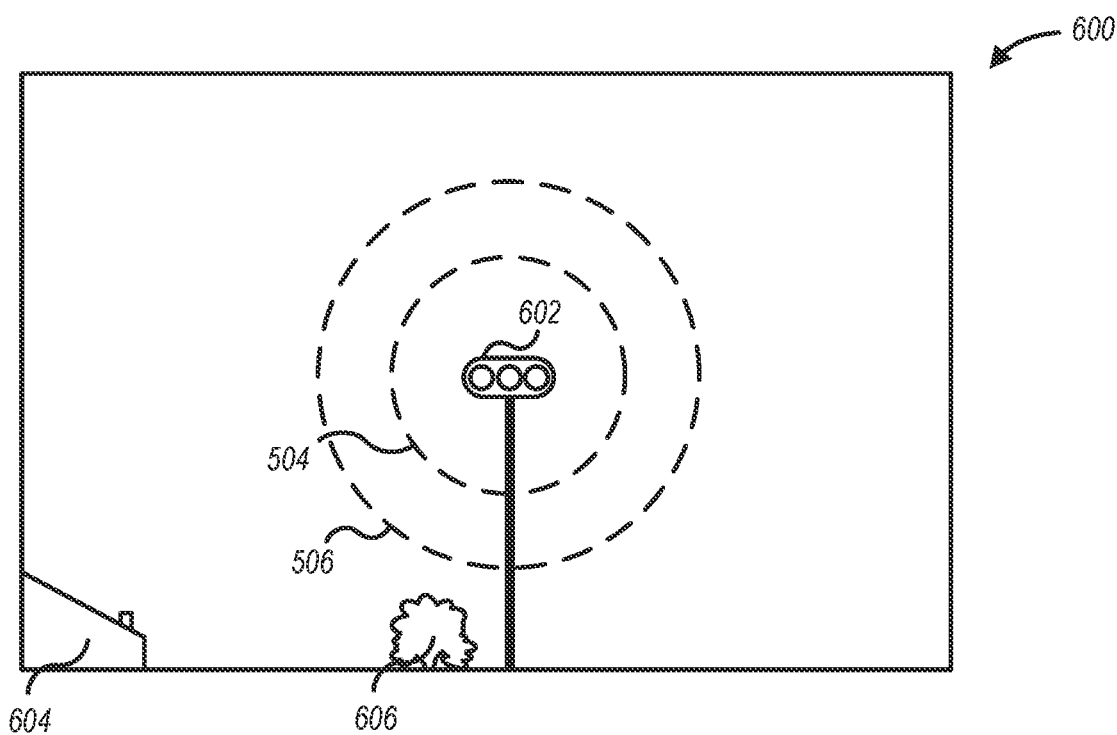
FIGS. 6A, 6B, 6C, and 6D show examples of images obtained using a camera device according to one or more embodiments of the present disclosure.

FIGS. 6A, 6B, 6C, and 6D show examples of images obtained using the camera device 228 according to one or more embodiments of the present disclosure. FIG. 6A shows an image 600 that includes an object 602 corresponding to portions of the second mounting arm 304, the housing 306, and three LNBFs 308 of the antenna device 116; an object 604 corresponding to a portion of the house 404; and an object 606 corresponding to a portion of the tree 402. The content receiver device 118 may be configured to perform various processes (e.g., image recognition, photo recognition, picture recognition, pattern recognition processes) that cause the content receiver device 118 to detect or recognize one or more objects within the image 600. When the image 600 is analyzed by the content receiver device 118, the content receiver device 118 determines that no obstruction of the antenna device 116 is present because there is no object (other than the object 602 corresponding to portions of the second mounting arm 304, the housing 306, and three LNBFs 308 of the antenna device 116) within the first region or area 504. In addition, the content receiver device 118 determines that no future or potential obstruction of the antenna device 116 is present because there is no object (other than the object 602 corresponding to portions of the second mounting arm 304, the housing 306, and three LNBFs 308) within the second region or area 506.

Figure 6B:
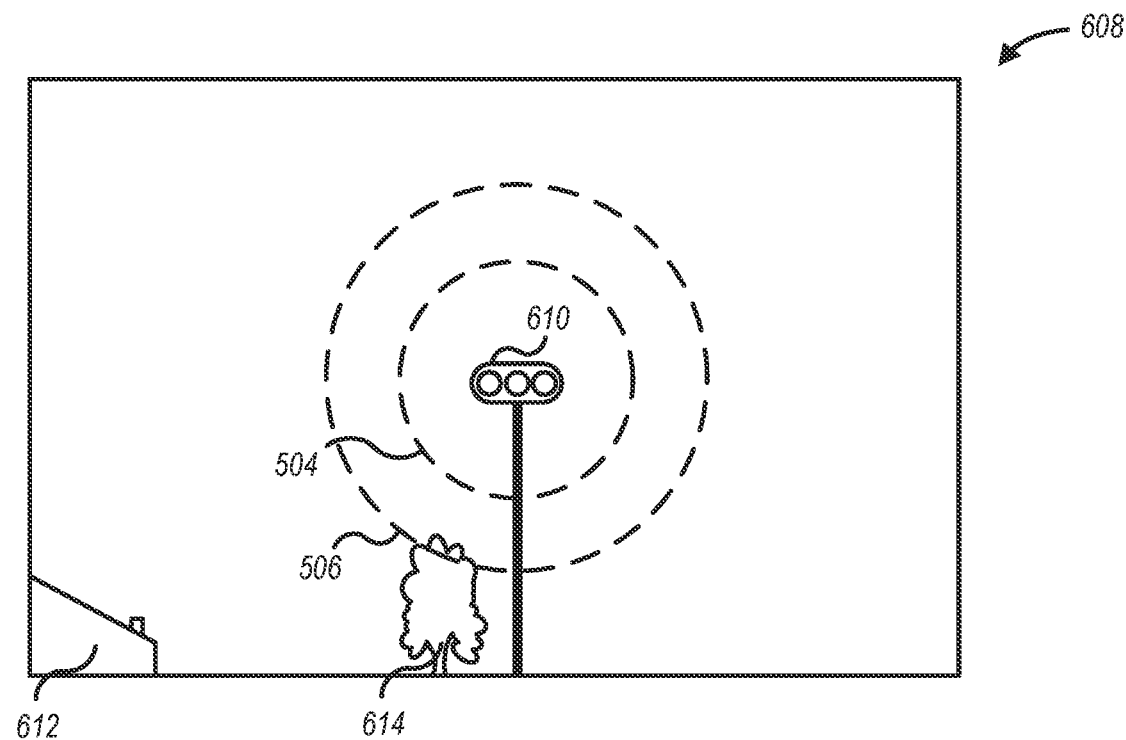

FIG. 6B shows an image 608 that includes an object 610 corresponding to portions of the second mounting arm 304, the housing 306, and three LNBFs 308 of the antenna device 116; an object 612 corresponding to a portion of the house 404; and an object 614 corresponding to a portion of the tree 402. When the image 608 is analyzed by the content receiver device 118, the content receiver device 118 determines that no obstruction of the antenna device 116 is present because there is no object (other than the object 608 corresponding to portions of the second mounting arm 304, the housing 306, and three LNBFs 308 of the antenna device 116) within the first region or area 504. In addition, the content receiver device 118 determines that a future or potential obstruction of the antenna device 116 is present because, part of the image 614 corresponding to the portion of the tree 402 is within the second region or area 506.

Figure 6C:
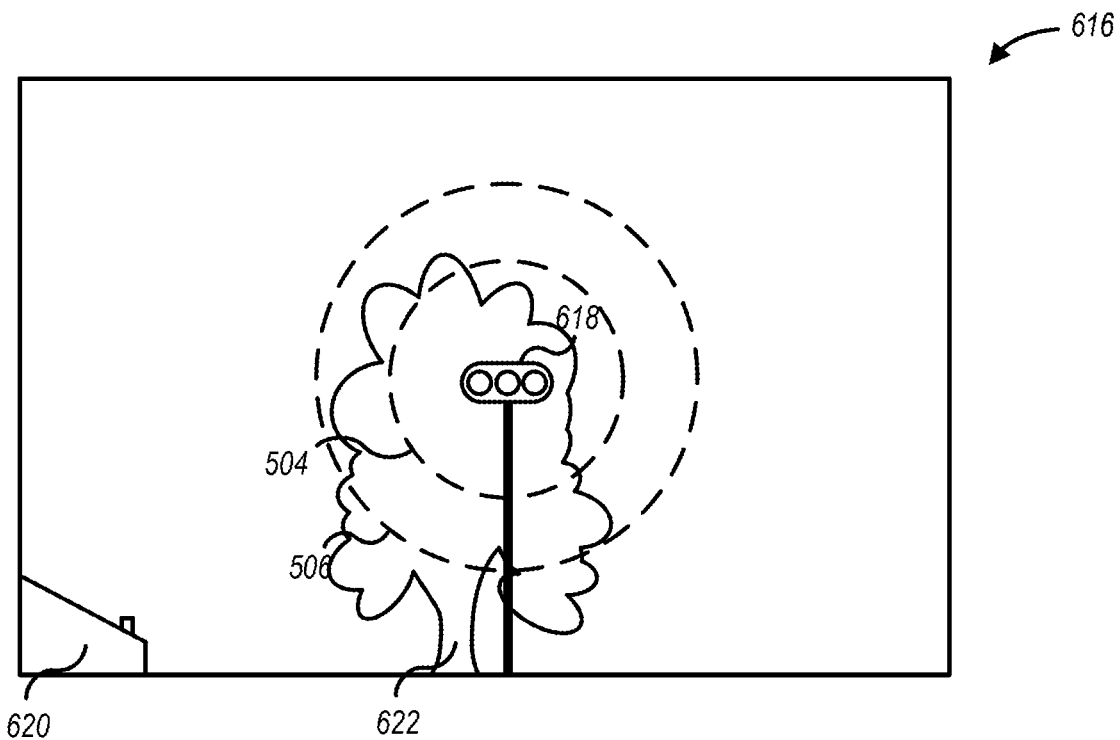

FIG. 6C shows an image 616 that includes an object 618 corresponding to portions of the second mounting arm 304, the housing 306, and three LNBFs 308 of the antenna device 116; an object 620 corresponding to a portion of the house 404; and an object 622 corresponding to a portion of the tree 402. When the image 616 is analyzed by the content receiver device 118, the content receiver device 118 determines that an actual obstruction of the antenna device 116 is present because the object 618 is within the first region or area 504.

Figure 6D:
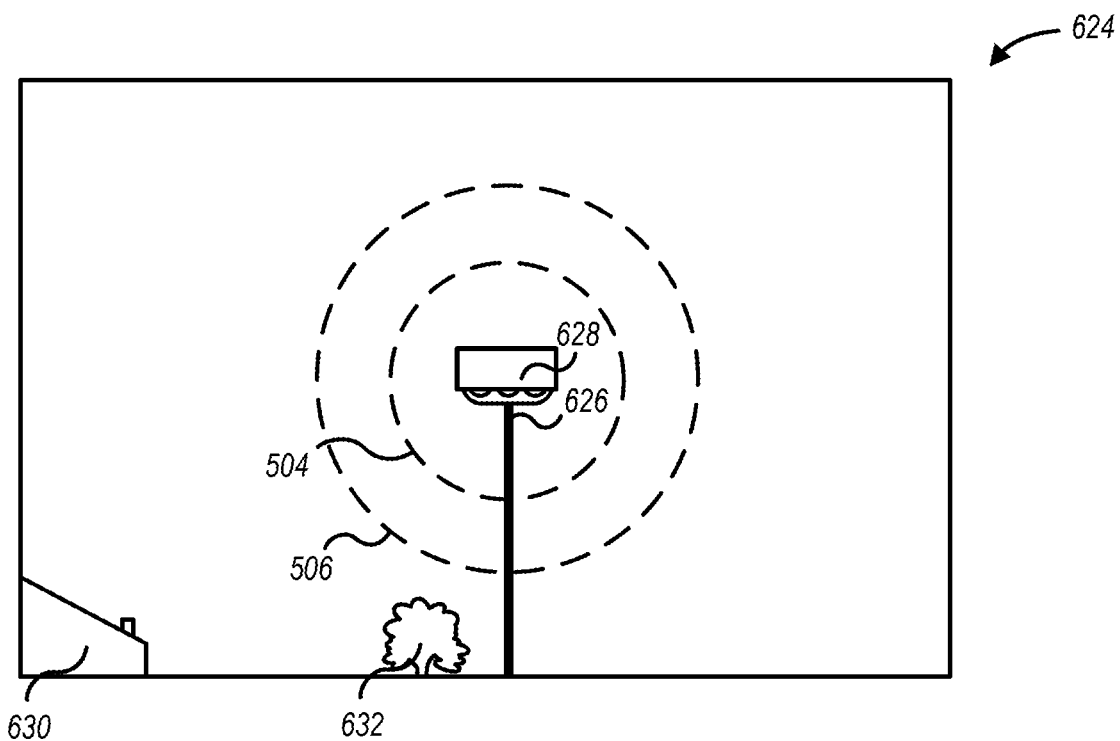

FIG. 6D shows an image 624 that includes an object 628 corresponding to portions of the second mounting arm 304, the housing 306, and three LNBFs 308 of the antenna device 116; an object 628 corresponding to a cardboard box that strong winds have blown onto the antenna device 116 and that has become stuck the antenna device 116 and partially obscure the housing 306 and the LNBFs 308 of the antenna device 116; an object 630 corresponding to a portion of the house 404; and an object 632 corresponding to a portion of the tree 402. When the image 624 is analyzed by the content receiver device 118, the content receiver device 118 determines that an actual obstruction of the antenna device 116 is present because a significant portion of the LNBFs 308 of the antenna device 116 are not detected. For example, the content receiver device 118 may be configured to use the image 500 as a baseline image, wherein the content receiver device 118 compares the object 502 corresponding to portions of the second mounting arm 304, the housing 306, and three LNBFs 308 of the antenna device 116 in the image 500 to the object 628 corresponding to portions of the second mounting arm 304, the housing 306, and three LNBFs 308 of the antenna device 116 in the image 624. The content receiver device 118 may determine a number of pixels of the object 502 having values that match (or are within a first predetermined threshold) of values of corresponding pixels of the object 626. If the number of pixels of the object 502 having values that match (or are within a first predetermined threshold) of values of corresponding pixels of the object 626 are determined to be less than a second predetermined threshold, the content receiver device 118 may determine that an actual obstruction of the antenna device 116 is present.

In one or more embodiments, the content receiver device 118 provides image data (e.g., corresponding to images that are similar to the images shown in FIGS. 6A, 6B, 6C, and 6D) to the image analysis device 108, which proactively attempts to find a potential obstruction or movement of the antenna device 116 by performing change analysis processing that identifies changes between different images or image data. The particular images or image data that are compared may be images or image data that are sequentially obtained, or may be images or image data that are obtained over a period of. For example, if the image analysis device 108 compares sequential images or image data and identifies a change corresponding to a leaf bud of a leaf on a tree, the image analysis device 108 may determine that such a change is not a potential obstruction of the antenna device 228 that warrants contacting a technician to schedule an inspection of the antenna device 228; however, if the image analysis device 108 compares an older image or image data to a current image or image data and identifies a change corresponding new buds, the image analysis device 108 may determine that such a change is a potential obstruction of the antenna device 228 that warrants contacting a technician to schedule an inspection of the antenna device 228. For example, if the image analysis device 108 compares image #100 and image #101, a detected change between those images might not be significant enough to contact a technician to schedule an inspection of the antenna device 228; however, if the image analysis device 108 compares image #70 and image #101, a detected change between those images might be significant enough to contact a technician to schedule an inspection of the antenna device 228.

Figure 7A:
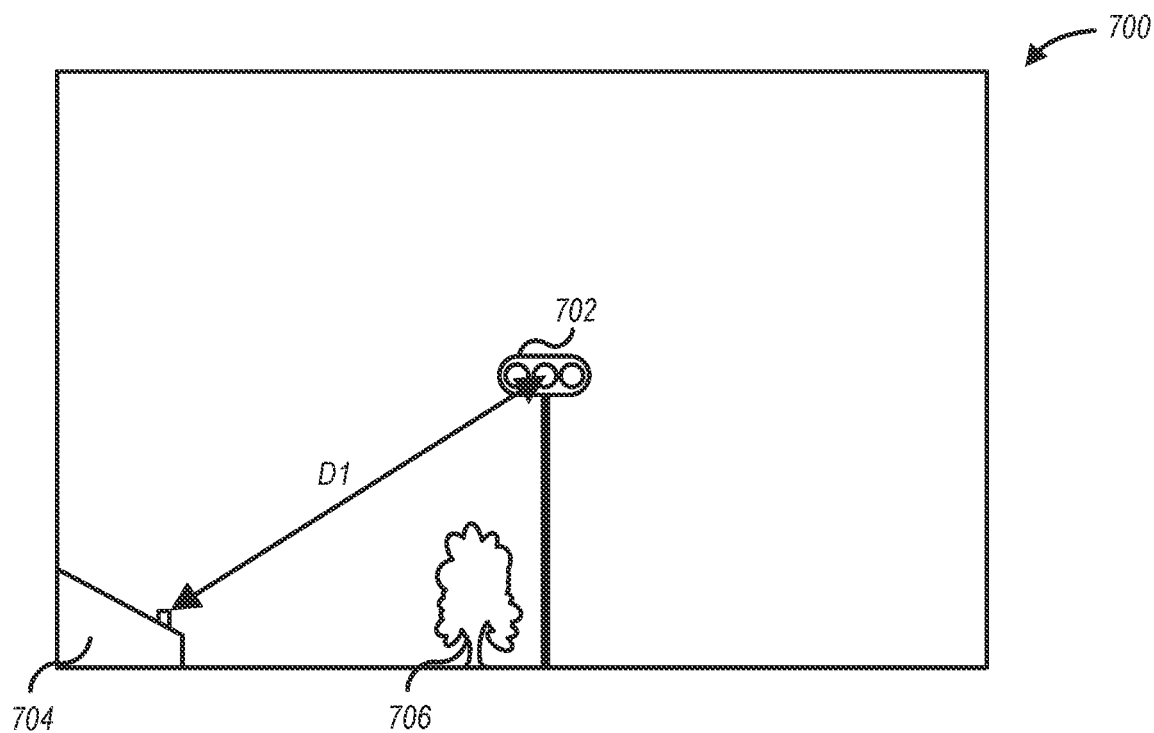
FIGS. 7A and 7B show examples of images obtained using a camera device according to one or more embodiments of the present disclosure.
Figure 7B:
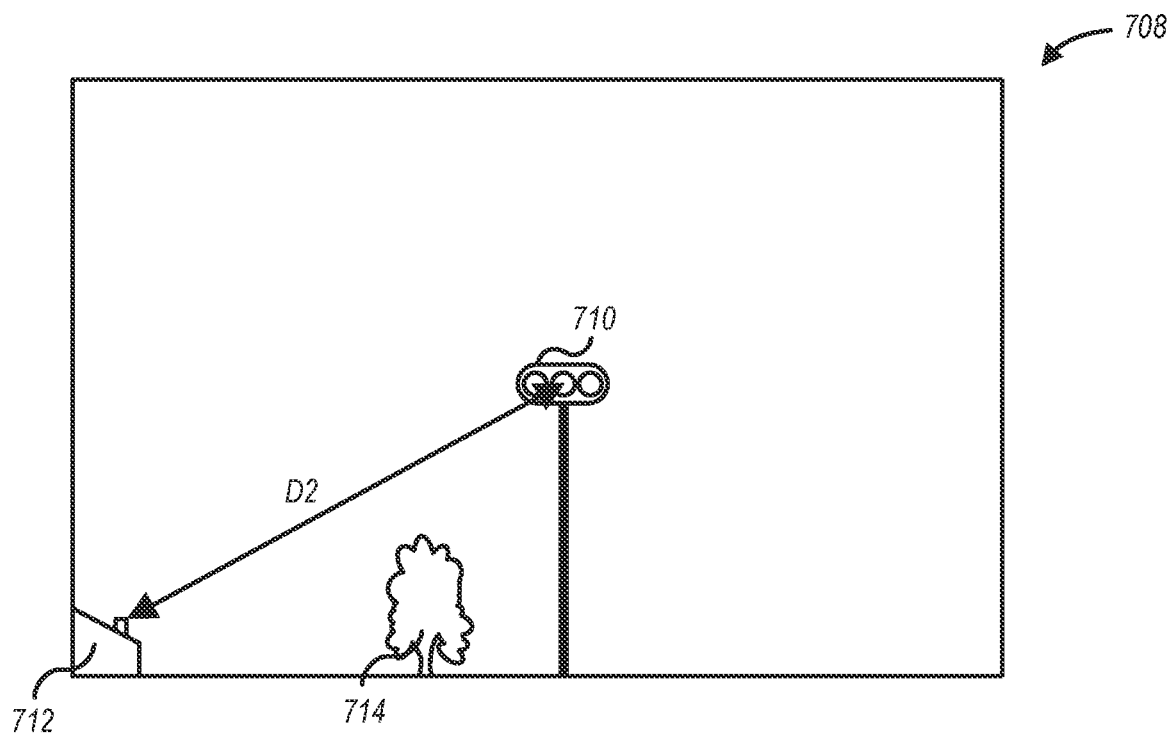

FIGS. 7A and 7B show examples of images obtained using the camera device 228 according to one or more embodiments of the present disclosure. FIG. 7A shows an image 700 that includes an object 702 corresponding to portions of the second mounting arm 304, the housing 306, and three LNBFs 308 of the antenna device 116, an object 704 corresponding to a portion of the house 404, and an object 706 corresponding to a portion of the tree 402. The image 700 may correspond to an initial position of the antenna device 116, wherein the image 700 may be obtained, for example, by a technician after the antenna device 116 is initially installed and tested to ensure proper orientation with respect to the satellite 114. The image 700 may subsequently be used as a baseline image by the content receiver device 118, wherein an amount of change relative to the baseline image may be used by the content receiver device 118 to determine whether the antenna device 116 has moved from the initial position.

FIG. 7B shows an image 708 that includes an object 710 corresponding to portions of the second mounting arm 304, the housing 306, and three LNBFs 308 of the antenna device 116, an object 712 corresponding to a portion of the house 404, and an object 714 corresponding to a portion of the tree 402. When the image 708 is analyzed by the content receiver device 118, the content receiver device 118 determines that movement of the antenna device 116 is detected.

For example, the content receiver device 118 compares the image 708 with the baseline image 700. The content receiver device 118 may identify a stationary object in both pictures, such as the house 404 (e.g., or one or more portions of the house 404, such as the chimney 406), and then determine respective distances between a predetermined portion of the stationary object (e.g., corresponding a predetermined portion of the part of the chimney 406 of the house 404) and a predetermined portion of an object corresponding to the LNBFs 308 of the antenna device 116 (e.g., the geometric center of the middle LNBF 308) in the image 708 and the baseline image 700.

For example, the content receiver device 118 may determine that the distance between the predetermined portion of the stationary object and the predetermined portion of the LNBFs 308 of the antenna device 116 in the image 700 is D1, and the distance between the predetermined portion of the stationary object and the predetermined portion of the LNBFs 308 of the antenna device 116 in the image 708 is D2. The content receiver device 118 may then compare D1 and D2, and if the difference between D1 and D2 is greater than a threshold value, determine that movement of the antenna device 116 has occurred.

The examples of FIGS. 7A and 7B are described based on determining a single distance in each of the image 700 and 708. In one or more embodiments, the content receiver device 118 determines a plurality of distances between the predetermined portion of the antenna device 116 and a portion of a plurality of stationary objects (or a plurality of portions of a single stationary object), in order to determine whether movement of the antenna device 116 has occurred.

Additionally or alternatively, the content receiver device 118 may determine whether movement of the antenna device 116 has occurred by determining whether particular angles indicated by the images have changed over time, for example, due to high winds, kids playing, re-roofing, etc. For example, the content receiver device 118 may determine a direction corresponding to the horizon and then determine whether an angle of a portion of the antenna device 116 with respect to the direction corresponding to the horizon has changed over time. In addition, the content receiver device 118 may determine a distance to the horizon based on the image data, and determine that movement of the antenna device 116 has occurred if the distance to the horizon is determined to change over time.

Figure 9A:
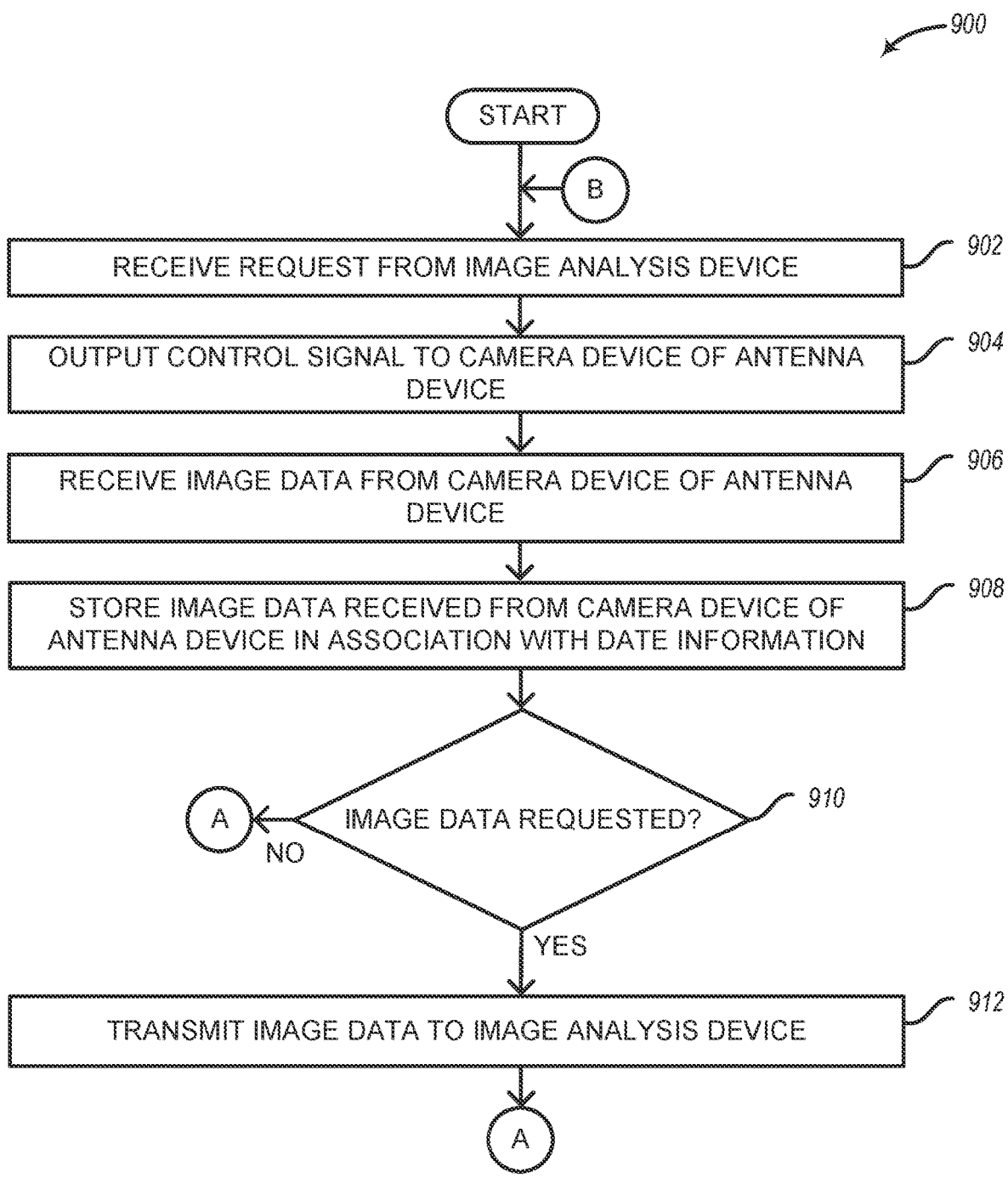
FIGS. 9A and 9B show portions of a flowchart of a method performed by a content receiver device according to one or more embodiments of the present disclosure.
Figure 9B:
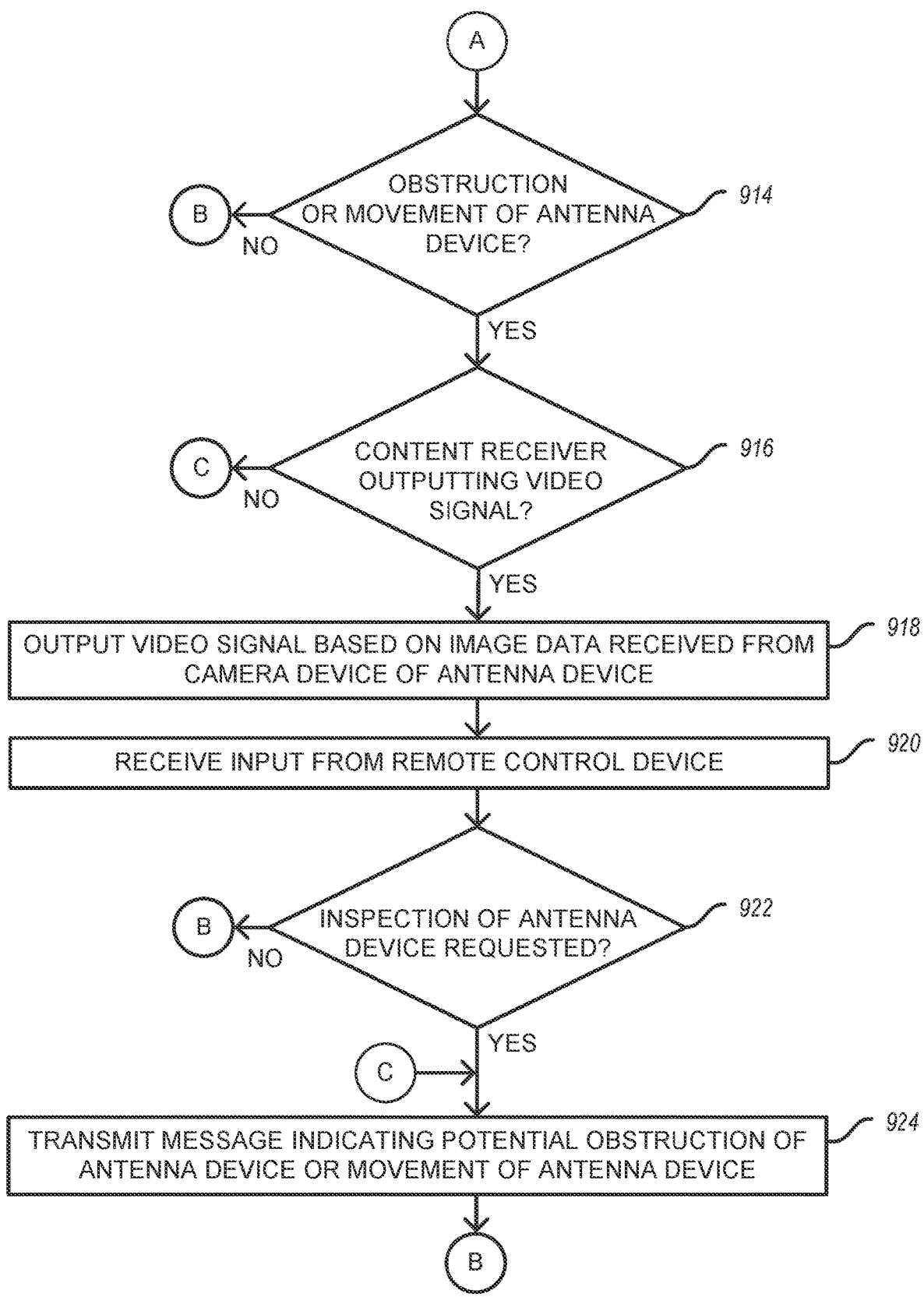

Also, the content receiver device 118 may obtain the date associated with particular image data that indicate movement of the antenna device 116 and send the date to the image analysis device 108 in the message transmitted at 924 of FIG. 9B. Accordingly, a customer service representative can inform the user of the content receiver device 118 of an approximate date when movement of the antenna device 116 occurred, which the user may use to determine the cause of movement. The customer service representative may control the content receiver device 118 to output a signal that causes the audiovisual device 122 to display a first image acquired before the movement of the antenna device 116 occurred, and also display a second image acquired after the movement of the antenna device 116 occurred. For example, if work was performed on the roof of the house 400 in a period of time between a time when the first image was acquired and a time when the second image was acquired, the user may conclude that the movement of the antenna device 116 resulted from the work performed on the roof of the house 400.

Figure 8A:
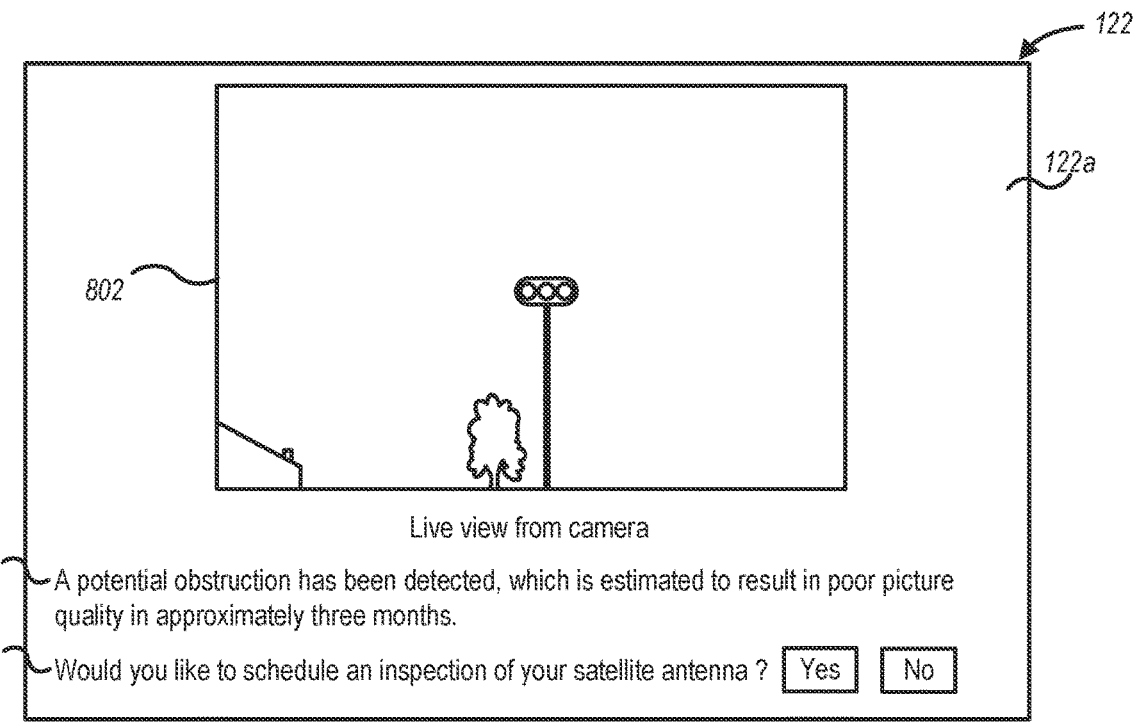
FIGS. 8A and 8B show examples of display screens obtained using output of a content receiver device according to one or more embodiments of the present disclosure.
Figure 8B:
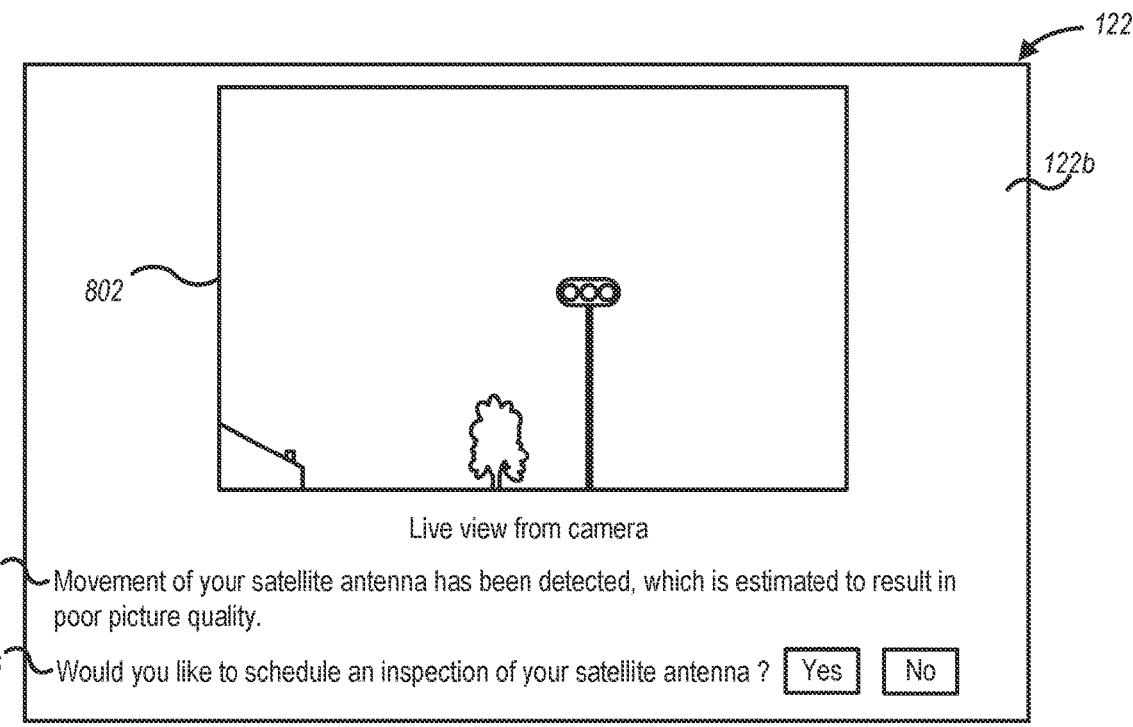

FIGS. 8A and 8B show examples of display screens obtained using output of the content receiver device 118 according to one or more embodiments of the present disclosure. FIG. 8A shows a display screen 122a of the audiovisual device 122, which the audiovisual device 122 displays based on a signal output by the content receiver device 118. The display screen 122a includes a display area 802 in which a live (or selected) image obtained by the camera device 228 is displayed. Also, the display screen 122a includes a message 804 which indicates that a potential or actual obstruction of the antenna device 116 has been detected. In one or more embodiments, the message 804 includes a period of time (e.g., 3 months) when a detected potential obstruction is estimated to become an actual problem that results in poor picture quality. For example, the content receiver device 118 may analyze image data corresponding to a plurality of images taken over a period of time in order to identify trends, such as a rate of growth of foliage of the tree 402, which is used to estimate or predict when the tree 402 will grow to a point where its foliage obstructs the antenna 116 and causes poor picture quality.

In addition, the display screen 122a includes a message 806 asking whether a user would like to schedule an inspection of the antenna device 116, for example, by a service technician, a gardener, or an arborist. The user may use the remote control device 232 to make a selection corresponding to "Yes" or "No". If the user selects "Yes", the content receiver device 118 causes the transceiver 234 to transmit, to a customer service facility (e.g., in which the image analysis device 108 located), a message indicating that a potential obstruction has been detected, and the user would like to schedule an inspection of the antenna device 116. The message may include image data corresponding to the image displayed in the display area 802, for example. A customer service representative may contact (e.g., by telephone, electronic mail, chat, etc.) the user to schedule an appointment for the inspection of the antenna device 116, after receiving the message transmitted in response to the user making the selection corresponding to "Yes". If the user selects "No", the content receiver device 118 does not transmit the message.

FIG. 8B also shows a display screen 122b of the audiovisual device 122 that is displayed based on a signal output by the content receiver device 118. The display screen 122b of the audiovisual device 122 shown in FIG. 8B is similar in many relevant respects to the display screen 122a of the audiovisual device 122 shown in FIG. 8A. One difference is that, instead of the message 804, the display screen 122b of the audiovisual device 122 shown in FIG. 8B includes a message 808 indicating that movement of the antenna device 116 has been detected, which is estimated to result in poor signal quality. The user may then use the remote control device 232 make a selection to schedule an inspection of the antenna device 116, as describe in connection with FIG. 8A.

FIG. 9 shows an example of a method 900 performed by the content receiver device 118 according to one or more embodiments of the present disclosure. For example, the memory 216 of the content receiver device 118 stores instructions that, when executed by a processor of the CPU 212, cause the content receiver device 118 to perform the method 900. The method 900 begins at 902.

At 902, the content receiver device 118 receives a request from the image analysis device 108. For example, the transceiver 234 of the content receiver device 118 receives a request message from the image analysis device 108 via the network 106 using Internet Protocol (IP) communication protocol standards (e.g., TCP, UDP, etc.). By way of another example, the interface devices 226a of the peripheral device interface 226 receives the request message from the image analysis device 108 via the antenna device 116, wherein the request message is transmitted by the content distributor device 104 via the satellite 114. The method 900 then proceeds to 904.

At 904, the content receiver device 118 outputs a control signal to the camera device 228 of the antenna device 116, in response to receiving the request from the image analysis device 108 at 902. For example, the CPU 212 of the content receiver device 118 causes a predetermined value or code, which indicates that image data is to be acquired, to be transmitted to the camera device 228 via the interface device 226b and a cable coupled to the interface device 226b and the camera device 228. By way of another example, the CPU 212 of the content receiver device 118 may cause a voltage level of a signal output from the interface device 226b to change from a first value to a second value, wherein the signal is transmitted to the camera device 228 of the antenna device 116 via and a cable coupled to the interface device 226b and the camera device 228 of the antenna device 116. The method 900 then proceeds to 906.

At 906, the content receiver device 118 receives image data from the camera device 228 of the antenna device 116. For example, the content receiver device 118 receives the image data from the camera device 228 of the antenna device 116 via the interface device 226b, which is a coaxial cable connector that is coupled via a coaxial cable to the camera device 228 of the antenna device 116. The method 900 then proceeds to 908.

At 908, the content receiver device 118 stores the image data received from the camera device 228 of the antenna device 116 at 906 in association with date information. For example, the content receiver device 118 stores the image data received from the camera device 228 of the antenna device 116 in the hard drive 224, along with metadata including information that indicates a current date and a current time based output from the clock 238. The method 900 then proceeds to 910.

At 910, the content receiver device 118 determines whether the image data has been requested by the image analysis device 108. If the content receiver device 118 determines "NO" the image data has not been requested by the image analysis device 108, the method proceeds to 914. If the content receiver device 118 determines "YES" the image data has been requested by the image analysis device 108, the method proceeds to 912. For example, if the content receiver device 118 determines that the request received at 902 includes a predetermined value or code, which indicates that the image analysis device 108 has requested that the image data be transmitted to the image analysis device 108, the content receiver device 118 determines "YES" at 910. If the content receiver device 118 does not determine that the request received at 902 includes the predetermined value or code, the content receiver device 118 determines "NO" at 910.

At 912, the content receiver device 118 transmits the image data received from the camera device 228 of the antenna device 116 at 906 to the image analysis device 108. For example, the transceiver 234 of the content receiver device 118 transmits a message including the image data received from the camera device 228 of the antenna device 116 at 906 to the image analysis device 108 via the network 106 using IP communication protocol standards (e.g., TCP, UDP, etc.). Accordingly, a technician or customer service representative can cause the image analysis device 108 to request image data from the content receiver device 118. The technician or customer service representative can also request a set of image data stored by the image analysis device 108 by including, for example, information that indicates a range of dates, wherein the content receiver device 118 provides image data that is associated date information that indicates one or more dates within the range of dates. Accordingly, the technician or customer service representative can request, receive, and view a series of date/time stamped images or photographs in order to visually determine and/or confirm whether foliage is obstructing or is likely to obstruct the antenna device 116, for example. The method 900 then proceeds to 914.

At 914, the content receiver device 118 determines whether a potential or actual obstruction or movement of the antenna device 116 is detected. If the content receiver device 118 determines "NO" a potential or actual obstruction or movement of the antenna device 116 is not detected, the method returns to 902. If the content receiver device 118 determines "YES" a potential or actual obstruction or movement of the antenna device 116 is detected, the method proceeds to 916.

In one or more embodiments, the image analysis device 108 performs the processing described above in connection with FIGS. 6A, 6B, 6C, and 6D to determine whether a potential or actual obstruction of the antenna device 116 is detected. Also, the image analysis device 108 may perform the processing described above in connection with FIGS. 7A and 7B to determine whether movement of the antenna device 116 is detected. At 914, the content receiver device 118 may receive a message from the image analysis device 108 at 914, wherein the message includes information that indicates whether a possible obstruction or movement of the antenna device 116 has been detected by the image analysis device 108.

In one or more embodiments, at 914, the content receiver device 118 performs the processing described above in connection with FIGS. 6A, 6B, 6C, and 6D to determine whether a potential or actual obstruction of the antenna device 116 is detected. Also, at 914, the content receiver device 118 may perform the processing described above in connection with FIGS. 7A and 7B to determine whether movement of the antenna device 116 is detected.

At 916, the content receiver device 118 determines whether a signal is currently being output from the content receiver device 118 to the audiovisual device 122. If the content receiver device 118 determines "NO" a signal is not currently being output from the content receiver device 118 to the audiovisual device 122, the method proceeds to 924. If the content receiver device 118 determines "YES" a signal is currently being output from the content receiver device 118 to the audiovisual device 122, the method proceeds to 918. For example, at 916, the content receiver device 118 determines, based on information that indicates an operating state of the content receiver device 118, whether a signal is currently being output from the interface device 226c, which may be a coaxial cable connector that is coupled via a coaxial cable to the audiovisual device 122.

At 918, the content receiver device 118 outputs a signal based on the image data received from the camera device 228 of the antenna device 116 at 906. For example, the content receiver device 118 outputs a signal that causes the display screen 122a shown in FIG. 8A to be displayed by the audiovisual device 122 if a potential obstruction of the antenna device 116 is detected at 914, or outputs a signal that causes the display screen 122b shown in FIG. 8B to be displayed by the audiovisual device 122 if movement of the antenna device 116 is detected at 914. It is noted that the content receiver device 118 outputs the audiovisual signal at 918 only if it is likely that a user is currently viewing the audiovisual device 122 (i.e., the content receiver device 118 is currently outputting a signal to the audiovisual device 122, as determined at 916). The method 900 then proceeds to 920.

At 920, the content receiver device 118 receives input from the remote control device 232. For example, the content receiver device 118 receives the input from the remote control device 232 via the interface device 226e, which is an infrared transceiver. The input received at 920 corresponds to a selection made by the user in response to the message 806 in FIG. 8A or 8B that asks the user whether the user would like to schedule an inspection of the antenna device 116. The method 900 then proceeds to 922.

At 922, the content receiver device 118 determines whether inspection of the antenna device 116 is requested based on the input from the remote control device 232 received at 920. If the content receiver device 118 determines "NO" inspection of the antenna device 116 is not requested, the method returns to 902. If the content receiver device 118 determines "YES" inspection of the antenna device 116 is requested, the method proceeds to 924. For example, at 922, the content receiver device 118 determines whether inspection of the antenna device 116 is requested based on a value or code indicated by the input received from the remote control device 232 at 920.

At 924, the content receiver device 118 transmits a message indicating that a potential obstruction of the antenna device 116 or movement of the antenna device 116 has been detected. For example, the transceiver 234 transmits the message to a customer service facility via the network 106 using IP communication protocol standards (e.g., TCP, UDP, etc.), wherein the message indicates that a potential obstruction has been detected, and the user would like to schedule an appointment for an inspection of the antenna device 116. The method 900 then returns to 902.

By way of example, the message transmitted by the content receiver device 118 at 924 includes an identifier of the content receiver device 118 (e.g., serial number of the content receiver device 118), an identifier of the user of the content receiver device 118 (e.g., name, account number, telephone number, electronic mail address, etc.), and one or more predetermined values or codes. Such predetermined values or codes may include a first predetermined value or code indicating that an actual obstruction of the antenna device 116 has been detected, a second predetermined value or code indicating that a potential obstruction of the antenna device 116 has been detected, and a third predetermined value or code indicating that movement of the antenna device 116 has been detected.

In response to the message transmitted at 924 being received by a customer service representative, the customer service representative can contact (e.g., by telephone, electronic mail, chat, etc.) the user of the content receiver device to determine when the user would like to schedule an inspection of the antenna device 116. The customer service representative can then schedule an appointment with a technician, gardener, or arborist to proactively trim foliage that is obstructing the antenna device 116, for example. Accordingly, a potential obstruction of the antenna device 116 can be obviated before the potential obstruction of the antenna device 116 becomes an actual obstruction of the antenna device 116 that results in poor signal quality and, thus, poor video or audio quality. Additionally, after the antenna device 116 has been inspected and foliage trimmed, for example, the customer service representative may send another request to the content receiver device 118 in order to obtain current image data that is output by the camera device 118, wherein the request may be sent as an access command used in a conditional access system.

The various embodiments described above can be combined to provide further embodiments. Aspects of the embodiments can be modified, if necessary to employ concepts of the various patents, applications and publications to provide yet further embodiments.

For example, although FIG. 9A shows the content receiver device 118 outputting the control signal to the camera device 228 at 904, in response receiving the request from the image analysis device 108 at 902, the content receiver device 118 may be configured to periodically (e.g., daily, weekly, etc.) output the control signal to the camera device 228 at 904, without receiving the request from the image analysis device 108 at 902.

In addition, the camera device 228 may include a lighting device (e.g., one or more light emitting diodes) that is configured to illuminate the LNBFs 308 of the antenna device 116. For example, the lighting device may emit light having a wavelength between around 1 millimeter and 700 nanometers in the infra-red spectrum. The camera device 228 may be configured to illuminate the lighting device while obtaining image data based on a control signal output by the content receiver device 118.

Also, the camera device 228 may include autofocus components that are configured to automatically move one or more lenses of the camera device 228. The camera device 228 may be configured to perform automatic focusing based on a control signal output by the content receiver device 118.

Further, the camera device 228 may include a lighting sensor (e.g., photodiode) that is configured to obtain a value corresponding to an ambient lighting intensity. The camera device 228 may be configured to transmit the value corresponding to the ambient lighting intensity along with the image data to the content receiver device 118. The content receiver device 118 may be configured to adjust pixel values based on the value corresponding to the ambient lighting intensity.

Also, by way of example, the image analysis device 108 may request image data from the content receiver device at 902, while a user of the content receiver device at 902 is communicating (e.g., by telephone) with a customer service representative, wherein the image analysis device 108 forwards the image data received by the image analysis device 108 at 912 to the customer service representative, so that the customer service representative can confirm whether an inspection of the antenna device 116 is warranted.

In addition, the content receiver device 118 may provide the user of the content receiver device 118 with the ability to view image data corresponding to a live image from the camera device 228. For example, the user may operate the remote control device 232 to select a particular "channel" corresponding to the live image from the camera device 228. Also, the user may operate the remote control device 232 to make a selection that causes the image data corresponding to the live image to be stored by the content receiver device 118. In addition, the user may use the remote control device 232 to make one or more selections that cause image data corresponding one or more dates associated with the image data to be displayed on demand.

By way of example, a technician may operate the remote control device 232 to cause the content receiver device 118 to store image data corresponding to a first image before the technician works on the antenna device 116, and may cause the content receiver device 118 to store image data corresponding to a second image after the technician works on the antenna device 116. The technician may contact a customer service representative and ask the customer service representative to cause the image analysis device 108 to request the image data corresponding to the first and second images and, after the image data corresponding to the first and second images is received by the image analysis device 108, send the image data corresponding to the first and second images (e.g., in an electronic mail message) to the technician and/or the user of the content receiver device 118. For example, the technician can demonstrate to the user of the content receiver device 118 via the first image that there was an obstruction of the antenna device 116 when the technician arrived, and demonstrate to the user of the content receiver device 118 via the second image that the obstruction of the antenna device 116 has been removed by the technician.

Additionally, the image analysis device 108 may acquire image data from many content receiver devices 118 and store the acquired image data in a database for future testing and fine tuning of automated systems to improve on automation of detection of legitimate obstructions via software analyses. The image analysis device 108 also may cause software that has been updated or improved to be installed on the content receiver device 118.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system including:
a content receiver device; and
an antenna device coupled to the content receiver device, wherein the antenna device includes:
a reflector plate;
a mounting arm coupled to the reflector plate;
at least one low noise block downconverter feedhorn mounted on the mounting arm; and
a camera device mounted on the reflector plate or the mounting arm, and
wherein the content receiver device includes:
a first interface device;
a first processor coupled to the first interface device; and
a first memory storing instructions that, when executed by the first processor, cause the content receiver device to:
output a control signal to the camera device mounted on the reflector plate or the mounting arm via the first interface device,
receive image data from the camera device mounted on the reflector plate or the mounting arm via the first interface device after the control signal is output via the first interface device,
determine that the image data received from the camera device mounted on the reflector plate or the mounting arm via the first interface device indicates a potential or actual obstruction of the antenna device or movement of the antenna device, and
output a message indicating that the potential or actual obstruction of the antenna device or movement of the antenna device has been detected, in response to determining that the image data received via the first interface device indicates the potential or actual obstruction of the antenna device or movement of the antenna device.

2. The system according to claim 1, further comprising:
a transceiver coupled to the first processor,
wherein the instructions, when executed by the first processor, cause the content receiver device to output the message via the transceiver.

3. The system according to claim 1, wherein:
the instructions, when executed by the first processor, cause the content receiver device to output a signal based on the image data received from the camera device mounted on the reflector plate or the mounting arm, and
the signal output by the content receiver device based on the image data received from the camera device mounted on the reflector plate or the mounting arm is configured to indicate that the potential or actual obstruction of the antenna device or movement of the antenna device has been detected.

4. The system according to claim 3, wherein the instructions, when executed by the first processor, cause the content receiver device to:
receive input from a remote control device, and
output the message in response to determining that the image data received from the camera device mounted on the reflector plate or the mounting arm indicates the potential or actual obstruction of the antenna device or movement of the antenna device and in response to receiving the input from the remote control device.

5. The system according to claim 1, wherein the instructions, when executed by the first processor, cause the content receiver device to:
receive a request from an image analysis device, and
output the control signal to the camera device mounted on the reflector plate or the mounting arm in response to receiving the request from the image analysis device.

6. The system according to claim 5, wherein the instructions, when executed by the first processor, cause the content receiver device to:
transmit to the image analysis device the image data received from the camera device mounted on the reflector plate or the mounting arm.

7. The system according to claim 6, further comprising:
the image analysis device, wherein the image analysis device includes:
a second processor; and
a second memory storing instructions that, when executed by the second processor, cause the image analysis device to:
transmit the request to the content receiver device,
receive the image data from the content receiver device,
compare the image data received from the content receiver device with stored image data to determine that the image data received from the content receiver device indicates the potential or actual obstruction of the antenna device coupled to the content receiver device or movement of the antenna device coupled to the content receiver device, and
transmit to the content receiver device a message including information indicating that the image data indicates the potential or actual obstruction of the antenna device coupled to the content receiver device or movement of the antenna device coupled to the content receiver device,
wherein the instructions stored by the first memory, when executed by the first processor, cause the content receiver device to:

receive from the image analysis device the message including information indicating that the image data indicates the potential or actual obstruction of the antenna device coupled to the content receiver device or movement of the antenna device coupled to the content receiver device, and determine that the image data received from the camera device mounted on the reflector plate or the mounting arm indicates the potential or actual obstruction of the antenna device or movement of the antenna device in response to receiving from the image analysis device the message including information indicating that the image data indicates the potential or actual obstruction of the antenna device coupled to the content receiver device or movement of the antenna device coupled to the content receiver device.

\* \* \* \* \*